Aug. 4, 1970 YU HATA 3,522,441
PARAMETRON DEVICES AND METHOD OF MAKING THE SAME
Filed Aug. 3, 1967  7 Sheets-Sheet 1

INVENTOR.
YU HATA
BY
Wolfe, Hubbard, Voit & Osann
ATTYS.

YU HATA 3,522,441

PARAMETRON DEVICES AND METHOD OF MAKING THE SAME

Filed Aug. 3, 1967

INVENTOR.
YU HATA

BY

Wolfe, Hubbard, Voit & Osann
ATTYS.

INVENTOR.
Yu Hata

Aug. 4, 1970  YU HATA  3,522,441
PARAMETRON DEVICES AND METHOD OF MAKING THE SAME
Filed Aug. 3, 1967  7 Sheets-Sheet 7

INVENTOR.
Yu Hata
BY
Wolfe, Hubbard, Voit & Osann
ATTYS.

United States Patent Office 3,522,441
Patented Aug. 4, 1970

3,522,441
PARAMETRON DEVICES AND METHOD OF
MAKING THE SAME
Yu Hata, Tokyo, Japan, assignor to TDK Electronics
Company, Limited, Tokyo, Japan, a corporation of
Japan
Filed Aug. 3, 1967, Ser. No. 658,265
Claims priority, application Japan, Aug. 13, 1966,
41/53,067, 41/53,068
Int. Cl. G11c 5/02, 11/14, 11/20
U.S. Cl. 307—88                                11 Claims

ABSTRACT OF THE DISCLOSURE

This invention relates to a parametron device comprising a core group in which a plurality of oscillating coils are arranged on a wire having a ferromagnetic film formed on the surface and the ferromagnetic wires having the above mentioned oscillating coils are arranged in parallel with each other and as separated from each other, printed base plates having output coils through which said cores are made to pass at center and input coils, and ferromagnetic shield plates, said ferromagnetic shield plates and at least one of said printed boards being piled up alternately.

---

This invention relates to parametron devices and methods of making the same.

Generally, in a device in which a stray capacity is utilized in a resonance circuit, the frequency to be handled is mostly high up to a microwave band. But the present invention relates to a parametron device in which such comparatively low frequency as around 20 mc./s. is utilized.

In a parametron utilizing a stray capacity, many windings are provided in the form of a solenoid so that the stray capacity between the wires of the winding and the inductance of the winding may be utilized to cause an oscillation and a ferromagnetic film plated wire is inserted in the part corresponding to the center axis of the winding so as to be an exciting circuit.

In a parametron in which a stray capacity is used as a resonance capacity and which is excited by dual three-beat excitation, such parts as a condenser and resistor used in a conventional parametron can be omitted. In this very simple and economical form of parametron, the structure of using a conductive wire having a ferromagnetic film formed on the entire surface as a nonlinear reactance is suitable. In such case, a so-called cross-field parametron in which the circumferentially wound winding along the center wire is used as an oscillating coil, and such exciting current as will oscillate at the frequency tuned with the stray capacity of the coil is applied on the longitudinal direction of the center wire is adapted to the device of the present invention.

An object of the present invention is to provide a parametron device wherein a plurality of printed boards on which are formed coupling inductances and coupling circuits are piled up in layers so that three-dimensional parametron circuitries which can be coupled in any of the three longitudinal, lateral and vertical directions may be economically and easily formed in a device using many of the above mentioned cross-field film parametrons.

Another object of the present invention is to provide a parametron device wherein oscillating elements which can be coupled in any of the vertical and horizontal directions are contained in one block.

A further object of the present invention is to provide a parametron device wherein the oscillating element can be easily molded, does not face to air, which has extreme features of long life and high reliability.

Another object of the present invention is to provide a parametron device wherein the relative positions of the oscillating coil, spiral coil, input coil, isolating cupper plate and ferromagnetic plate can be arranged with any desired precision.

A further object of the present invention is to provide a parametron device wherein the asymmetry of the coupling coefficients of the parametron oscillating winding and the input coil is tolerated.

The other objects and advantages of the present invention will become clear by reading the following detailed explanation with reference to the drawings.

The present invention consists of:

(a) stray capacity parametron elements,
(b) a coupling circuit network by laminated printed plates and
(c) shields and intermediate ring plates so as to be an integrated three-dimensional circuitry block.

A center wire having the above mentioned ferromagnetic film formed on the entire surface (for example, a fine copper wire or insulated wire silver-plated on the surface) is made a core. A winding wound in a single layer or two or more layers along the periphery of said core is so made that a plurality of turns may be in close contact with each other and is so excited as to oscillate with the frequency tuned with an inductance and stray capacity formed according to the number of turns. Further, the beginning and end of said winding are not connected but are open.

A plurality of sets of parametrons arranged at proper intervals on the above mentioned core are arranged parallelly with its axis and at proper intervals. A spiral coil and a one-turn coil arranged around an oscillating coil between the parametrons formed on each of the cores are made an output coil and input coil, respectively. Further, a coupling circuit formed on a printed board and consisting of a circuitry connecting these coils is arranged. In thus forming any logical circuit of parametrons according to the exciting phase for each predetermined core, the logical circuit of parametron is formed cubically between the parametron groups arranged in the form of a cubic matrix. In this point, as the coupling circuit on the above mentioned printed plate is of a mutual coupling in only the range limited in the plane along the surface, the coupling in the vertical direction (or the direction of the height of the cube) is difficult. Further, in the conventional coupling circuit of this kind, the relative position of the output coil with the oscillating winding is limited to be in one place for each oscillating winding, the range of the deviation of the position allowable to improve the uniformity of the coupled output is slight and the position of the input coil is also the same.

Figures 2, 4:
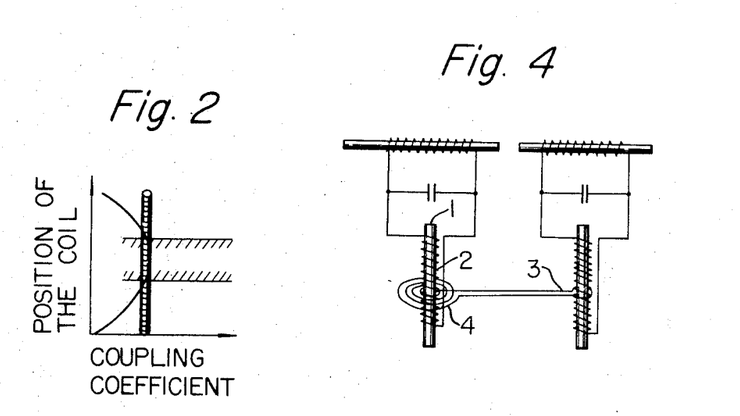
FIG. 2 shows a coupling coefficient distribution.
FIG. 4 shows a conventional parametron device.

Further, in case a coupling circuit formed on the above-mentioned printed board is combined with conventional coupled transformers in which ferrite bars are used or which are of such formation as is shown in FIG. 4, in order to obtain a sufficient coupling coefficient for a sufficient phase control, the center of the spiral coil will have to be as close to the oscillating winding as possible, many turns of windings will be required, the diameter will have to be considerably large and it will be difficult to reduce the distance between the cores.

The present invention is:

(a) to make the coupling in the vertical direction of parametron oscillating elements possible,
(b) to reduce the restriction of the position of the coupling coils and (c) to reduce the diameter and number of turns of the output coil.

Further, according to the present invention, it is possible to narrow the distance between the parametrons formed on the same core, to reduce the stray coupling between the cores, to obtain a sufficient shielding effect against the external undesirable magnetic field and to economically make the density of the formation of parametrons very high.

The present invention shall now be explained with reference to embodiments.

In FIG. 7, (A) shows a relation between the output coil and short ring and (B) shows a coupling coefficent distribution.

In FIG. 8, (A) is a sectioned view showing the relative position of the magnetic conductor plates and printed boards and (B) is a plan view.

In FIG. 16, (A) shows an arrangement of a shield ring and (B) shows a coupling coefficient curve.

In FIG. 17, (A) shows an arrangement of an output coil and (B) shows a variation of a coupling coefficient curve.

In FIG. 19, (A) shows another embodiment of the present invention and (B) shows a perspective view of a vertically split conductor.

Figure 1:
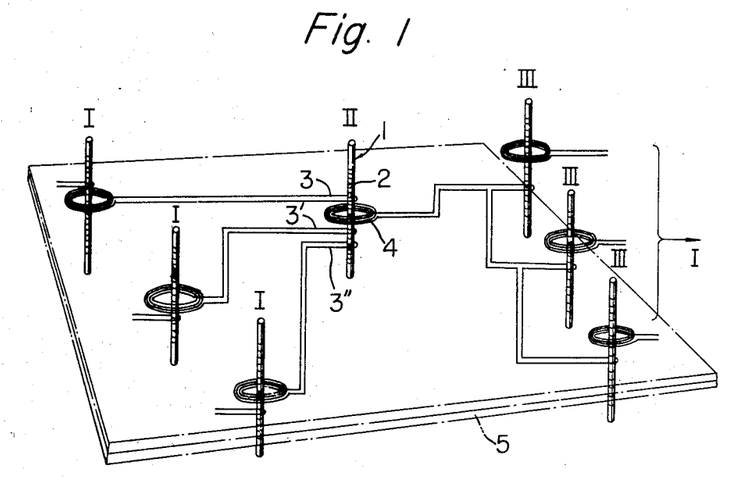
FIG. 1 shows a fundamental manner of coupling the devices of the present invention.

FIG. 1 shows the most fundamental coupling manner in the device of the present invention. 1 is a ferromagnetic film, 2 is an oscillating coil wound on said ferromagnetic film, 3, 3' and 3" are input coils and 4 is a spiral output coil formed on a printed board 5.

FIG. 2 shows a variation of the fundamental coupling coefficient with the spiral output coil by the axial position of the oscillating coil, representing a ridge-shaped curve having the maximum coupling coefficient in the center of the winding width. Therefore, the range allowable to the deviation of the position from the fluctuation of the coupling coefficient allowable to each element is the range hatched in the drawing. This is the same also with the input coil. Therefore, all the printed boards must be positioned in this range. The spiral output coil 4 formed on one printed board is on a periphery with the oscillating coil 2 as a center, the magnetic flux by the oscillating coil is of a density usually at least at order of decade as high as in the above mentioned conventional coupling transformer and, therefore, as different from the case of making the coupling transformer an axis, the form of the spiral may begin in a position rather away from the center and may be of a small number of turns. Further, as this coil is connected to a load substantially close to a shorted state, it is also as a shield ring to avoid an indefinite undesirable coupling between the adjacent elements.

Figure 3:
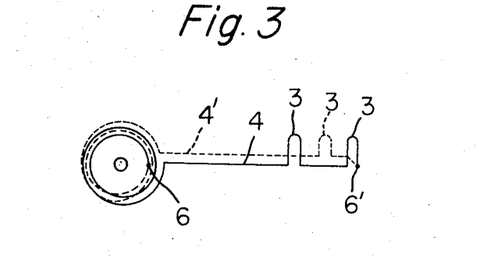
FIG. 3 shows output and input coils.

In FIG. 3, 4 is the part of a spiral output coil on the front side of the printed board and 4' is the part of the same on the back side provided on the other side of the printed board; 6 and 6' are through-holes made in the printed board so that the winding may be connected from this side of the printed board to the other side. The output of the spiral coil connected in the same direction on the front and back sides through the hole 6 will pass through a plurality of input coils 3 connected in series and to be branched, will then be shorted through the hole 6' and will form a closed circuit. As the coupling circuit which can be formed of the above mentioned spiral output coil 4 formed on one printed board is limited to be within the plane of the printed board 5 in which the spirals are arranged, so that the coupling in the vertical direction of the cube may be made possible by only using a plurality of such printed boards it is made means therefor that the same output can be obtained from any of two or more positions separated at least in the vertical direction of the oscillating coil of each element and that the oscillating coils of the elements are arranged as deviated from each other in the vertical direction according to the order of the beats of the excitation to be coupled.

The coupling relation between the oscillating coil and spiral output coil shall now be explained.

Figure 5:
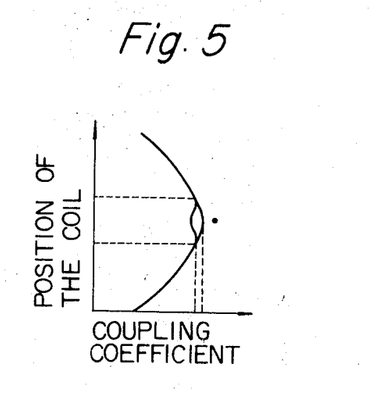
FIGS. 5 and 6 show coupling coefficient distribution when short rings are provided.
Figure 6:
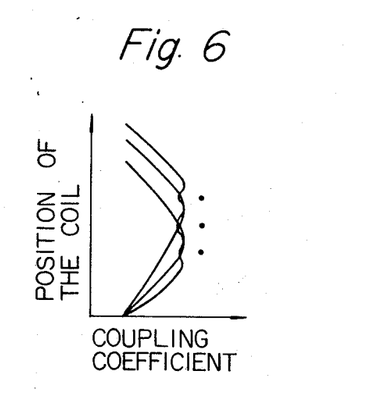

As shown in FIG. 2, the coupling of the spiral coil and oscillating winding varies depending on the position of the coil with respect to the winding. However, as the load connected to the actual spiral coil is substantially close to a shorted state, the coil will operate also as a short ring and the actual coupling coefficient curve in the case that a load is connected to the coil will be rather flat at the top of the ridge as shown in FIG. 5. Further, this curve shows the variation of the coupling coefficient of the input coil and oscillating coil with the variation of the position of each input coil when the spiral output coil is positioned in the center of the winding width. Further, if the spiral output coil itself moves vertically, the curve will become as shown in FIG. 6. In such case, as an output coil of a preceding beat of almost no load to the one-turn coil is only connected to the actual input coil, the variation of this curve by the insertion of the input coil will be neglectful. Further, if the variation of the coupling coefficient is limited to be in a certain range (From the logical majority decision condition, the variation is desired to be slight.), the range in the vertical direction in which the coil is to be positioned will be limited to be the range shown with the broken line in FIG. 5.

By means of using a short ring of a proper size in the center position of the oscillating coil, it is possible to obtain the two different, distant positions in the same coupling coefficient independently along the oscillating coil without impairing the absolute value of the coupling coefficient for the spiral output coil. Furthermore, it is clear that the three different positions can be obtained by using two such short rings positioned properly in proper size, and so on.

Figure 7A:
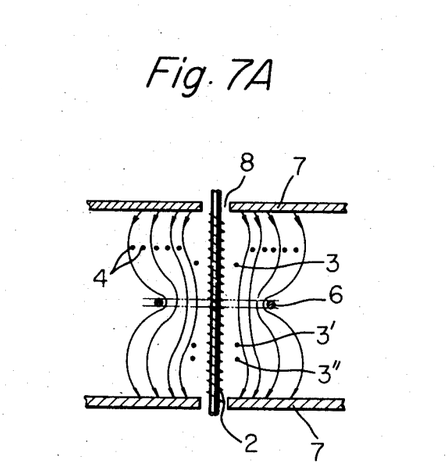
Figure 7B:
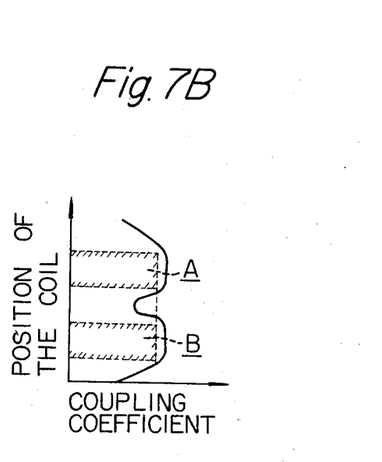

In FIG. 7, (A) shows the arangement of the short ring 6. 4 is an output coil. 3, 3' and 3" are input coils. (B) shows the state of the distribution of the coupling coefficient as varied by providing a short ring. A shows the upper side coupling region. B shows the lower side coupling region. In this case, a hole 8 is made in such ferromagnetic plate 7 as of Permalloy near each of the upper and lower ends of this oscillating coil 2 and the ferromagnetic film wire 1 is passed through it. With this ferromagnetic plate, the magnetic path of the magnetic fluxes by the oscillating coil can be balanced and the range of the positions of the same coupling coefficient separated above and below can be further expanded.

The above mentioned ferromagnetic plate further makes it possible to reduce the distance between the oscillating coils provided on the same core and has an effect of substantially intercepting the induction between the respective adjacent elements in the vertical direction and remarkably elevating the packing density in the direction of the height of the cube.

Figure 8A:
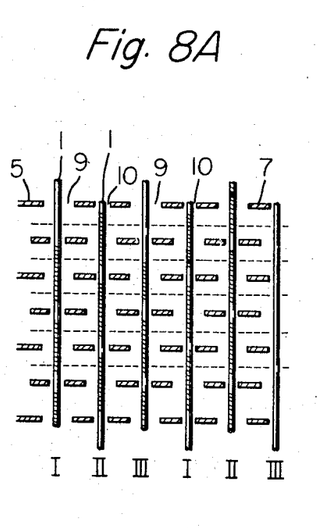

The element having the structure in FIG. 7 is formed on the same core and therefore an excitation of the same beat will be impressed. Therefore, the respective cores are arranged as deviated in the vertical direction, for example, by ½ the pitch in the vertical direction of one element at intervals of one beat according to the order of the beats as in FIG. 8.

Figure 8B:
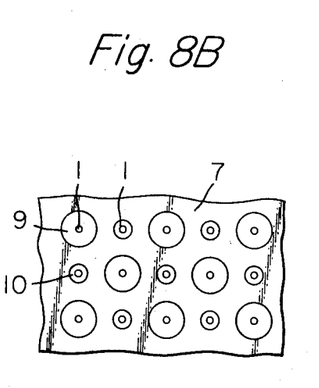

In FIG. 8, 1 is a ferromagnetic film wire on which is wound an oscillating coil. I, II and III are respective beats. Large holes 9 and small holes 10 are made alternately in the ferromagnetic plate 7. The ferromagnetic film wire 1 is passed through the center of each of these holes. The respective spaces partitioned with the ferromagnetic plate are deviated by ½ the element from each other between the adjacent beats and an intermediate short ring of a ferromagnetic material is positioned in the center of each oscillating winding so as to form each parametron. The output coil, the input coil and the printed plate on which is formed a circuit connecting them are arranged in the middle (shown with the broken line) between the magnetic shield plates over each element.

In such structure, for example, the magnetic shield plate for the interception between the elements in the vertical direction of the first beat can be also an intermediate short ring in the second beat and is therefore more economical. Further, this magnetic shield plate can be also a magnetic shield effective if the plate is conductive at least in the direction of the plane against the detrimental magnetic field impressed from the outside of the entire cube. In the case of piling up the magnetic shield plates on which are arranged two kinds of large and small holes and which are of the same dimensions and are made by press working, they may be arranged so that the magnetic shield plate patterns may be alternate.

The fact that the above mentioned magnetic shield plate is also the above mentioned short ring is effective also to further increase the widths of the upper and lower side coupling regions shown in FIG. 7. The short ring by the conductive magnetic shield plate will bring about not only a shorting effect but also a remarkable effect that the magnetic fluxes passing as concentrated on the peripheral surface of its hole will balance the magnetic fluxes in the upper and lower regions in order to obtain a uniform coupling coefficient.

Figure 9:
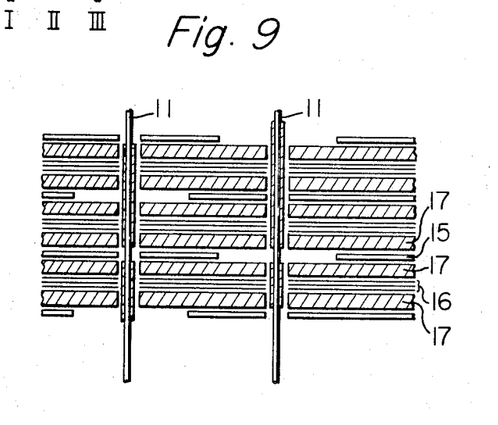
FIGS. 9 and 10 are sectioned views of the device of the present invention.
Figure 10:
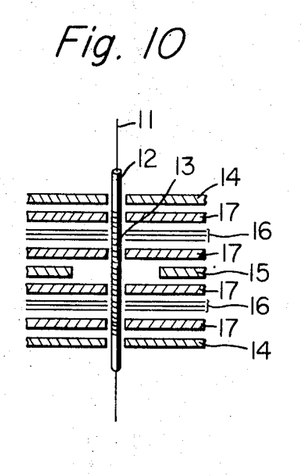

FIG. 9 is a sectioned view of an embodiment of the present invention. FIG. 10 is a detailed view of a part of the same. A ferromagnetic film wire made by electro-depositing nickel Permalloy to be about 1.1μ thick on a copper wire 11 of a diameter of 0.5 mm. is inserted and fitted in a celluloid pipe 12 of an outside diameter of 1.1 mm. and an inside diameter of 0.7 mm. having a formal copper wire of a diameter of 0.038 mm. closely wound on the magnetic film wire circumferentially by 250 turns per layer in three layers 13 so as to form a core. The winding width is 11.5 mm. A nickel Permalloy plate 14 of a thickness of 0.1 mm. is arranged in a position about 1 mm. away from each end of the core. The pitch in the vertical direction per element is 13.5 mm. and the diameter of the hole through which is passed the core is 2.0 mm. A nickel Permalloy plate of a thickness of 0.1 mm. having holes of a diameter of 6.0 mm. is arranged in the position of the middle of the oscillating winding so as to be intermediate short ring. This nickel Permalloy plate for each element of the adjacent beat has holes of a diameter of 2.0 mm. made and acts as an intercepting magnetic shield plate in the vertical direction just in the position deviated by a length of ½ the pitch. Printed board 16 of a thickness of 0.45 mm. provided with output coils and input coils are set in the middle between these Permalloy plates 14 and 15 as a center. A phenol resin plate of a thickness of about 3.2 mm. is provided as a spacer 17 on each side of said printed board 16.

Each of the above mentioned printed boards is a single plate printed on both surfaces. The thickness of the copper foil is 35μ. The thickness of the base plate is 0.4 mm. In the coupling circuit, a spiral coil of an inside diameter of 2 mm. and an outside diameter of 8 mm. having 15 turns on one surface has the upper and lower foils connected with each other through the through-holes arranged near its center. The coupling circuit of a width of 0.3 mm. forms an input coil of one turn in response to the positive and negative polarity for the coupled element. This coupling circuit is passed through the holes at the ends to form a closed circuit for the spiral coil.

The ferromagnetic film wire of each core is fed with an exciting current prepared by superimposing a direct current (DC) bias of 300 ma. on a high frequency current of 200 ma. R.M.S. of 2.0 megacycles in response to each beat. In such case, the coupling attenuation between the respective elements will be about 30 decibels and the static coupling coefficient between the adjacent elements in the vertical direction of the same phase will be about 40 decibels. The cores are arranged in the form of a matrix at intervals of 10 mm. In a laminated cube of 100 x 130 x 135 mm. are contained 1300 elements including the coupling circuit. For the input and output elements and the check elements in the main circuit network, special spiral coils are piled up according to the respective objects, are terminated at the edge of whole block with printed plates 1.6 mm. thick and are made to be able to be inserted into connectors.

A method of making a parametron device of the present invention shall be explained in the following.

Figure 11:
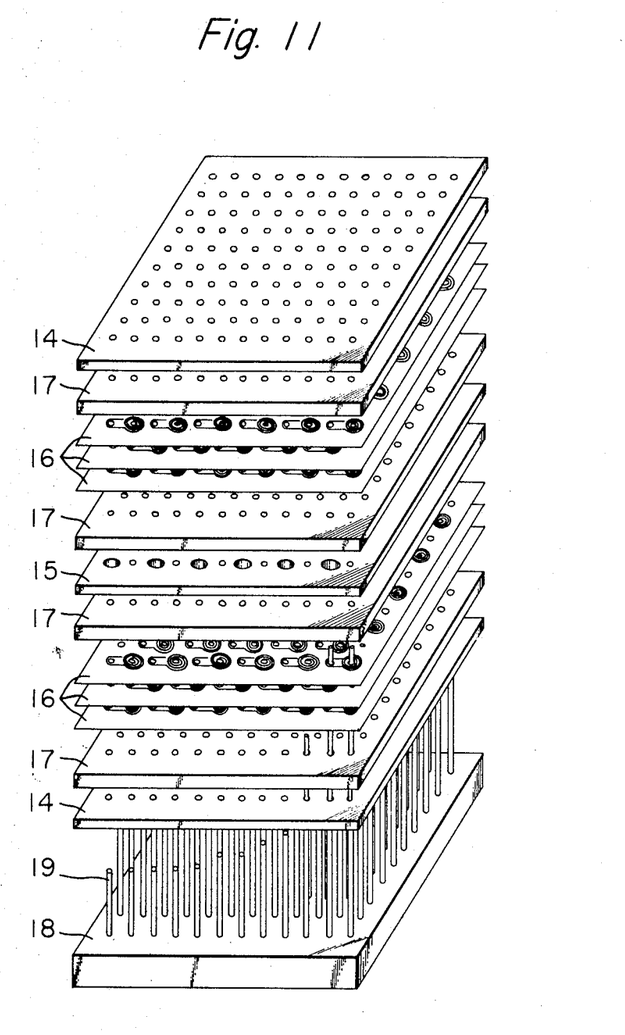
FIG. 11 is a perspective view showing an assembling step.
Figure 12:
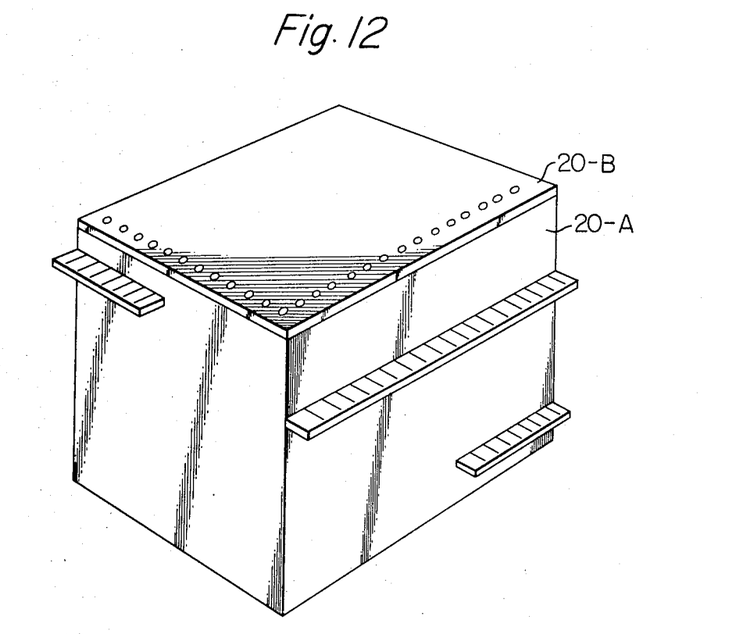
FIG. 12 is a perspective view of the apparatus of the device of the present invention.

As shown in FIG. 11, guide bars 19 are inserted into a fixed base 18 and a Permalloy plate 14, spacer 17, printed boards 16, spacer 17, Permalloy plate 15, spacer 17, printed board 16, spacer 17 and Permalloy plate 14 are piled up in the mentioned order around said bars 19 through the holes in the respective plates, are finally held with the same pressing plate as the fixing base 18, are pressed down to a determined height, are then heated so that a thermoplastic adhesive applied to all the surfaces of the piled plates in advance may penetrate between the respective piled plates due to the heat applied to the entire upper and lower fixed bases, are gradually cooled to be perfectly secured and are then pulled out of the press so as to be one block 20–A. Then Celluloid pipes to which are applied oscillating coils are inserted into the respective holes, a terminal plate 20–B for the exciting wire circuit formed to be a printed plate is fitted to the above mentioned block 20–A, the terminals of the terminal plate are connected with the ends of the ferromagnetic film wires and then an insulative solid solution is poured in to fix the respective members.

In the structure in FIG. 11, even if the printed plate for the coupling circuit arranged in the coupling region on each of the upper and lower sides is made of two printed plates of exactly the same pattern of a thickness made ½ that of it, the coupling coefficient between the respective elements will be exactly the same and therefore the electric characteristics will not be impaired at all. If it is made in such structure, even if either of the circuits of the above mentioned two exactly the same circuit made on printed board, is broken accidentally, the other circuit will operate and therefore the reliability of the device will be very high.

As described above, according to the device of the present invention, all the elements can be coupled in both vertical and horizontal directions without using any wiring or special coupling method between the respective plane blocks of circuit networks by conventional printed plates. Therefore, it is possible to contain all of any circuit networks in only one block. Further, as shown in the above mentioned embodiment, the device of the present invention has no surface in contact with air at all, is therefore very long in the life and is high in the reliability. In the mass-production, as there is substantially no connected part in the apparatus, it is possible to produce it very cheaply and to absolutely eliminate errors in the wiring. Further, even in the above mentioned example, the space required for one element is only 1.35 cm.³. If cores made high in the exciting frequency and small in the oscillating coil winding width are used and also finer ferromagnetic film wires are used, the distance between the cores and the distance between the elements in the vertical direction of the cores will be able to be remarkably reduced.

For example, if the stray capacity parametron elements are made a cubic circuit network of an oscillating coil pitch of 4 mm. and a distance between cores of 5 mm. with ferromagnetic wires of an excitation of 30 mc. and a diameter of 0.1 mm., it will be possible to make its size so small as to be only 15 x 14 x 14 cm. for a small calculating machine using about 30,000 elements of 0.1 cm.³ per element.

In the above described three dimensional parametron device, many ferromagnetic film wires are arranged parallelly with one another, a plurality of oscillating coils are fitted at fixed intervals in the axial direction around each ferromagnetic film wire, a printed board on which are formed spiral output coils and another printed board on which are formed input coils are fitted around the above mentioned oscillating coils and spacers and shielding conductive ferromagnetic shield plates are piled up on both sides of the above mentioned printed board. Therefore, a very high precision is required for the center holes made in the printed plates to pass the ferromagnetic film wires, the relative positions of the oscillating coils and spiral coils, the relative positions of the oscillating coils and input coils and the positions in the axial direction for the oscillating coils of the ferromagnetic plates. In case such dimensional precision reduces, the oscillation and conditions of logical operation will become non-uniform and the electric characteristics as of parametron elements will be obstructed.

In the following embodiment, a recessed part in which the end port of the other spacer can be fitted is made at one end of a tubular spacer having in the center a hole through which a ferromagnetic film wire can be passed, an oscillating coil is provided on the outer periphery of the tubular part of the above mentioned spacer and printed plates on which are formed spiral output coils and input coils, ferromagnetic shield plates and spacers are piled up and arranged in the axial direction of the tubular spacer on the outer periphery of said oscillating coil to form a parametron device so that the above mentioned problems of precision may be solved.

Figure 13:
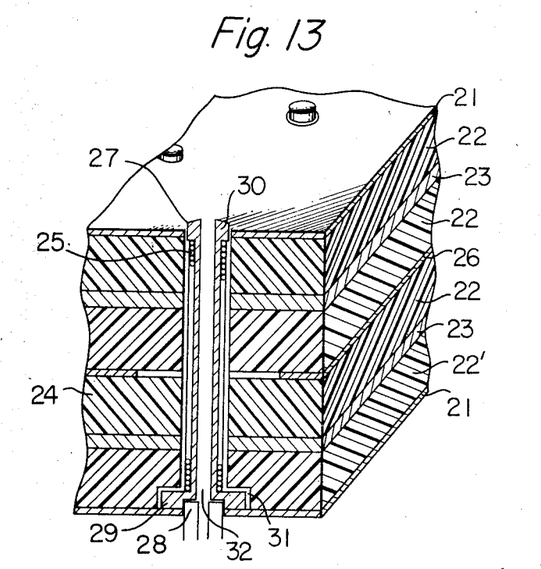
FIG. 13 shows another embodiment of the present invention.

In FIG. 13, 21 is a ferromagnetic shield, 22 and 22' are spacers, 23 is a printed plate, 24 is a tubular spacer having in the center a hole through which a ferromagnetic film wire can be passed, 25 is an oscillating coil wound on the periphery of said tubular spacer 24 and 26 is a short ring plate. A core 27 is formed by forming a three-layer coil 25 by closely winding a formal copper wire of a diameter of 0.038 mm. by 250 turns per layer on the periphery of the tubular Celluloid spacer of an outside diameter of 1.1 mm. and an inside diameter of 0.7 mm. having a hole through which can be passed a ferromagnetic film wire made by closely depositing nickel Permalloy to be of a thickness of about 1.1μ on a copper wire of a diameter of 0.5 mm. A recessed part 28 in which the end part of the other space can be fitted is made at one end of said tubular spacer 24. The winding width is 11.5 mm. In a position about 1 mm. away from each end of the winding width is arranged a ferromagnetic conductor 21 of nickel Permalloy of a thickness of 0.1 mm. The pitch in the vertical direction per element is 13.5 mm. The diameter of the hole through which the core is to be passed is 0.7 mm. A nickel Permalloy plate 26 of a thickness of 0.1 mm. having a hole of a diameter of 6.0 mm. is arranged in the position of the center of the oscillating coil 25 so as to be a short ring. This nickel Permalloy plate 26 has a hole of a diameter of 2.0 mm. made for each element of the adjacent in different beat and acts as an intercepting magnetic plate just in the vertical direction in a position deviated by a length of ½ the element. Logical circuit printed board 23 of a thickness of 0.45 mm. provided with output coils and input coils are provided by having the middle of these Permalloy plates 21 and 26 as a center and phenol resin plates of a thickness of 3.2 mm. are provided as spacers 22 and 22' on both sides of said printed plate 23. The above mentioned printed plate 23 is printed on both sides. The thickness of the copper leaf is 35μ. The thickness of the base material of the board is 0.4 mm.

In the core 27, a flange-shaped part 29 is provided at one end of the tubular spacer 24 and a recessed part 28 is made in the center of it. A flange-shaped part 30 of a smaller diameter is formed at the other end of the above mentioned core spacer 24 so as to be fitted in the recessed part of the other core spacer.

A gouged part 31 is made in a part of the spacer 22 and the flange-shaped part 29 of the core spacer 24 is inserted into said gouged part 31. Further, a ferromagnetic wire (not illustrated) is inserted into a hole 32 made in the center of the core spacer.

In this structure, in applying the oscillating coil to the tubular spacer, the oscillating coil can be provided precisely in the determined dimensions. In assembling the parametron device, the ferromagnetic film wire can be very simply inserted without the fear of damaging coil by scratching in case the oscillating coils are previously mounted onto the wire.

In this embodiment, as described above, one parametron element is formed by piling up a printed board on which are formed spiral coils, a printed plate on which are formed input coils, a spacer and a shield plate between both ends of a core spacer on which is wound on oscillating coil and a cubic parametron device can be formed by fitting in the axial direction the core spacers on which are formed the parametron elements. Therefore, the relative positions of the above mentioned oscillating coils, spiral output coils, input coils and ferromagnetic shield plates can be easily arranged at any desired precision.

Further, each element can be independently assembled in the direction of the height and is not of a so-called perfectly sealed structure and therefore, even if the shield plates, printed boards and spacers are irregular or deformed, it will be easy to make the element in a high precision of the planeness and dimensions. The element has excellent electric characteristics.

Figures 14, 15:
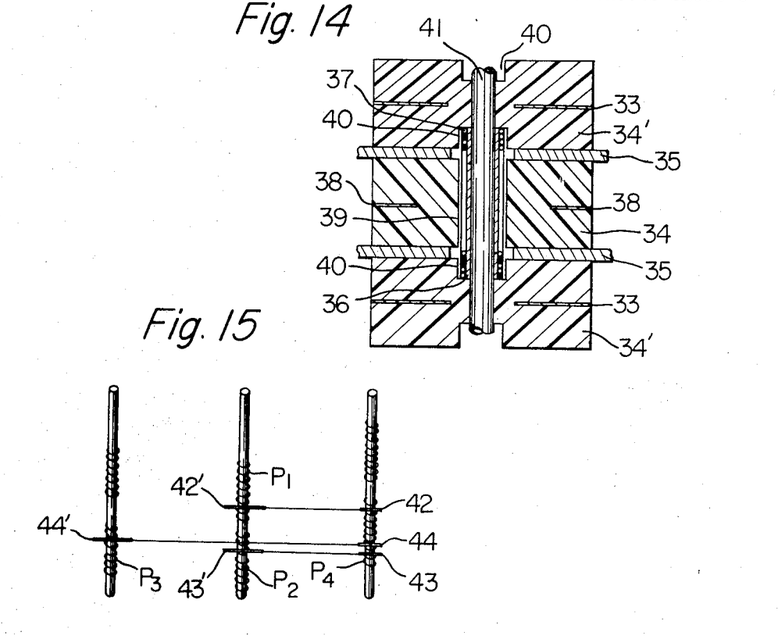
FIG. 14 shows a further embodiment of the present invention.
FIG. 15 shows a parametron device.
Figure 16A:
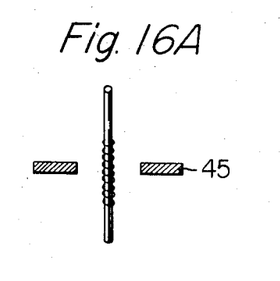
Figure 16B:
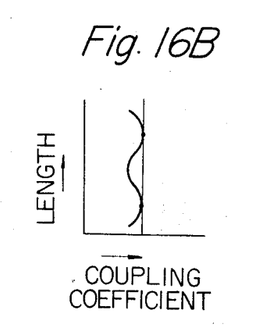
Figures 17A, 17B:
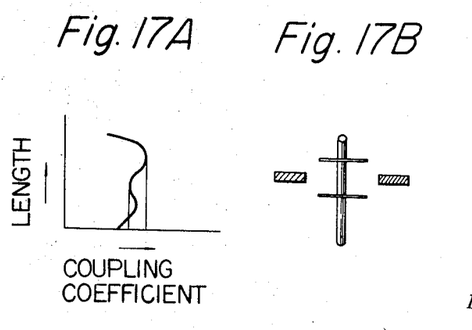

FIG. 14 shows another embodiment. In the drawing, 33 is a ferromagnetic shield, 34 and 34' are spacers, 35 is a printed board, 36 is a tubular spacer having in the center a hole through which a ferromagnetic film wire can be passed, 37 is an oscillating coil wound on the periphery of said tubular spacer 36 and 38 is a short ring plate. A coil 37 is formed by closely winding a formal copper wire of a diameter of 0.038 mm. in three layers by 250 turns per layer on the periphery of a tubular Celluloid spacer of an outside diameter of 1.1 mm. and an inside diameter of 0.7 mm. having a hole through which can be passed a ferromagnetic film wire 41 made by electrode-deposited nickel Permalloy to be of a thickness of about 1.1μ on a copper wire of a thickness of 0.5 mm. The spacer 34 is formed by making a hole 39 of an inside diameter of 20 mm. in which the tubular space 36 can be contained in the center of a phenol resin plate 4.0 mm. thick and fitting a ferromagnetic conductor shield 38 of a nickel Permalloy plate 0.1 mm. thick so as to bite on the outer periphery of this hole 39. This shield 38 engages as a short ring. In the same manner, the spacer 34' is formed by making a recessed part 40 of a diameter of 20 mm. in which the tubular spacer 36 can be fitted from both ends and fitting the shield 33 of a thickness of 0.5 mm. so as to bite in the outer peripheral part of said recessed part.

The tubular spacer 36 is contained in the hole 39 in the above mentioned spacer 34, the shield 38 is aligned with the oscillating coil 37, the printed plates 35 of a thickness of 0.45 mm. provided with output coils and input coils are arranged from above and below the spacer 34, the tubular spacer 36 is fitted in the recessed part 40 so as to hold them integrally and the spacers 34' are arranged. The spacer 34', printed board 35, spacer 34, printed board 35 and spacer 34' are piled up in the mentioned order, the above mentioned tubular spacer 36 is contained in the space within them and then the above mentioned ferromagnetic film wire 41 is passed through the hole in the spacer 36 so as to be integrally vertically passed through them.

In the above mentioned embodiment, as the ferromagnetic conductor shield is fitted so as to bite in the spacer, the number of parts will be reduced, the deviation of the fixed position of the parametron oscillating coil by errors in the dimensions will be entirely eliminated and the condition of logical operation and oscillation will become uniform. In the production and assembly, the assembling step will be simple, the time will be reduced and the economy will be very high.

In the above described parametron device, in carrying out the majority decision operation of an odd number of at least three inputs to be coupled with each oscillating wiring arranged as deviated by at least ½ the pitch in the order of the exciting beats in order to make the coupling in the vertical direction of the cube circuitry possible, as shown in FIG. 15, the input coils of the parametron $P_4$ is fed, for example, from the output coils of the parametrons $P_1$, $P_2$ and $P_3$ and are on the upper or lower level in the vertical direction respectively according to which each input parametron ($P_1$, $P_2$, $P_3$) belongs in either levels, therefore in order that the logical operation of the parametron $P_4$ may cause the majority decision of the input coils 42, 43 and 44, it is necessary that the coupling coefficient of these 3 input coils and the parametron $P_4$ should be uniform. However, the relative positions of these respective input coils 42, 43 and 44 with the oscillating winding can be so made as to obtain exactly the same coupling coefficient as shown in (B) in FIG. 16 in at least two places in the vertical direction of the oscillating winding, for example, by arranging a proper short ring 45 as shown in (A) in FIG. 16. But this is a relation which will be established only when such a coil which will be coupled with said parametron so as to be a load as the output coil is not present other than the input coil in said parametron in the strict sense of the word. In fact, as shown in FIG. 15, when output coils 1', 2' and 3' are arranged in order to otherwise feed the output from the parametron $P_4$, if the load effect of this output coil is considered, in the characteristics shown in (B) in FIG. 16, near the arrangement of the output coil, as shown in (A) in FIG. 17, the coupling coefficient will result in losing the symmetry. This asymmetry will become a cause of impairing the operating margin of the majority decision operation and will impair the reliability of the entire circuit.

In view of this point, this embodiment is to provide a parametron device wherein a symmetrical coupling coefficient can be always obtained irrespective of the arrangement of the upper and lower level positions of the input coil with a view to eliminating the above mentioned defect.

This embodiment is characterized by arranging a loading coil equivalent to an output coil in another level position in which no output coil is arranged. The form of the loading coil may be determined quite freely at any form. As an inductance is inserted, no electric power will be consumed. Further, when it is selected to be of a diameter well larger than of the input coil, it will be a shield ring intercepting noise inputs except input signals. Together with the perfect symmetry of the coupling coefficients of the upper and lower levels, the operating margin of the circuit will be remarkably increased. Further, by this circuit, the reliability of the entire device will be remarkably improved.

Figure 18:
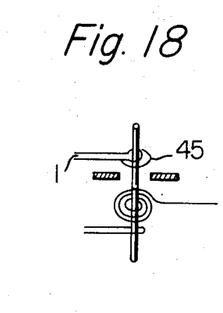
FIG. 18 shows another embodiment of the present invention.

FIG. 18 shows an embodiment of the present invention. It shall be explained with reference to the drawing. On the other surface of the printed board on which is formed the input coil 42 of the upper side level of the parametron $P_4$ in FIG. 15, a one-turn wound short ring 45 equivalent to the output coil is arranged so as to be of a diameter sufficiently larger than of the input coil and substantially the same as of the output coil.

The output coil is a spiral coil formed on a printed board and has its diameter and width so selected as to have exactly the same effect as the load effect when it is shorted at the end with another input coil.

In this embodiment, as the loading coil is arranged as described above, the asymmetry of the coupling coefficient can be very simply improved.

In forming a cubic parametron circuitry by using a plurality of cores made by forming such elements as parametrons at fixed intervals on a ferromagnetic wire having a ferromagnetic material formed uniformly on the surface, the coupling in the longitudinal and lateral directions of the cube can be easily made by a printed board or the like laid across these cores but, in order to make the coupling in the direction of the height of the cube possible, there has been used, for example, a method wherein the output from one parametron element is so made as to be able to be taken in the same manner out of two places in the vertical direction of the core and the position in the direction of the height of each element is deviated by ½ the pitch in the order of the exciting beat so that the coupling in the vertical direction by ½ the pitch per beat may be made possible. However, in such method, there is required an intermediate ring or the like so that the same output may be taken out of two places. Further, as it is presupposed therein that there is a sufficient winding width in the vertical direction in the oscillating winding, such method can not be applied to a parametron of such formation wherein a spiral coil formed, for example, on a printed board is used also as a spiral output coil to make an oscillating winding.

The following embodiment is characterized in that, in forming a cubic circuit, in order to make any coupling in the vertical direction possible, oscillating coils arranged in the respective positions of one input coil arranged in a different position of each element of a cubic matrix are parallelly connected or magnetically parallelly coupled at their free ends.

Thereby, as at least two parallelly connected or coupled parametrons will operate as one parametron as a logical element in principle, any input applied to any parallelly connected position will be quite equivalent and any majority decision logic can be made.

This circuit can be applied to such case that there is substantially no winding width in the vertical direction of the core as in a parametron of the form in which the oscillating winding is also an output coil, further, the positions and number of parametrons that can be parallelly connected are not limited and therefore it is very easy to design any logical circuit.

Figure 19A:
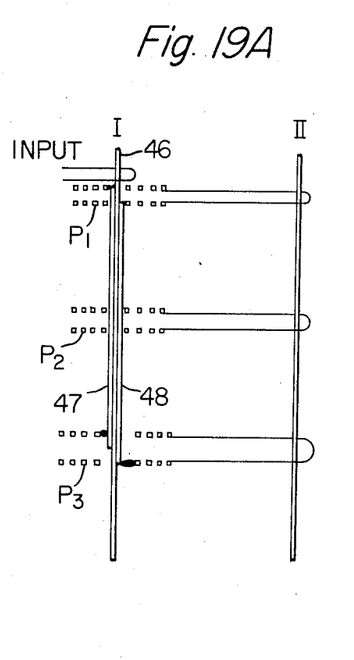
Figure 19B:
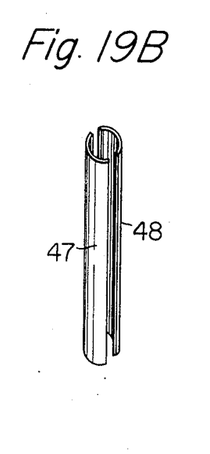

FIG. 19 shows another embodiment of the present invention wherein a pair of conductors 47 and 48 in the form of a vertically split tube are arranged outside a coaxial ferromagnetic wire 46 of a beat I and the upper and lower free ends of the respective spiral coils $P_1$, $P_2$ and $P_3$ are connected to the conductors 47 and 48, respectively, so that the input applied to $P_1$ may be simultaneously given to $P_2$ and $P_3$ and its output may be delivered on the respective levels in the different vertical positions.

Figure 20:
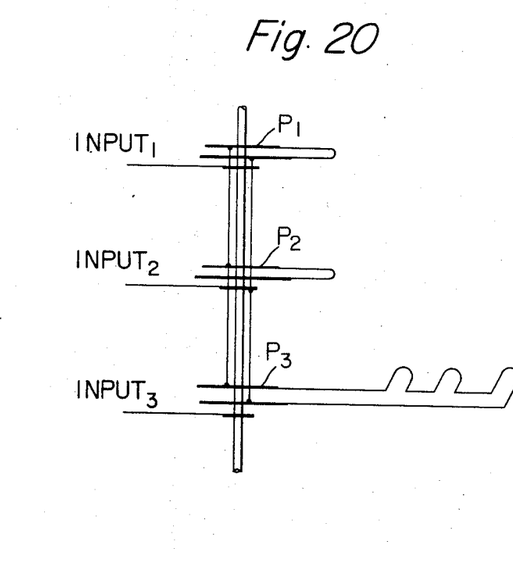
FIG. 20 shows another embodiment of the present invention.
Figure 21:
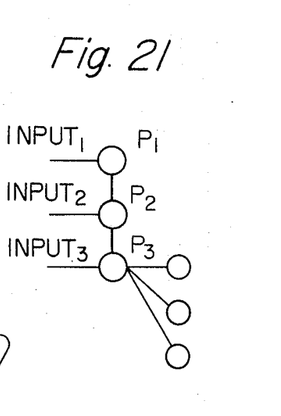
FIG. 21 shows an equivalent circuit.

FIG. 20 shows another embodiment wherein the central free ends of the spiral coils $P_1$, $P_2$ and $P_3$ are also parallelly connected so that the majority decision of the inputs on the different levels of inputs 1, 2 and 3 may be possible, the outputs of the spiral coils $P_1$ and $P_2$ are merely shorted and the output of the spiral coil $P_3$ is delivered to another parametron in the position of its level. (See FIG. 21.)

The cubic circuitry by such principle can be applied also to a parametron in which the oscillating winding is provided separately from the output coil. In such case, in the same manner, the respective free ends of the oscillating windings may be merely parallelly connected. It is not necessary to deviate them, for example, by ½ the pitch in the order of the exciting beats in order to make the coupling in the vertical direction possible as in the conventional method. Further, no intermediate ring is required.

This parallel connection is possible not only by parallelly connecting the free ends of the oscillating windings but also by magnetically coupling the oscillating windings with each other.

This principle is not limited to apply for only a stray capacity parametron. In such case, both ends of the oscillating coil or condenser in the resonance circuit may be parallelly connected.

What is claimed is:

1. A parametron device comprising a core group in which a plurality of oscillating coils of parametrons oscillating as tuned with the stray capacity of a winding are arranged on a wire having a ferromagnetic film formed on the surface and the ferromagnetic wires having the above mentioned oscillating coils are arranged in parallel with each other and separated from each other and are also arranged in the form of a matrix so that the respective parametrons may be different by a pitch divided by an integer of the arranging distance of the respective oscillating coils in the axial direction of the above mentioned ferromagnetic wire in turn according to the order of the exciting beats, printed base plates having a plurality of holes which are provided at fixed intervals and through which the above mentioned cores can be passed so that spiral output coils provided around said holes and input coils having at least one turn may form a closed circuit and ferromagnetic shield plates having first holes of a size sufficient to obtain at least two independent positions in which the coupling coefficient with the above mentioned oscillating coil obtains substantially the same value within the winding width and second holes having a diameter sufficient to pass the above mentioned core and to intercept the magnetic coupling above and below it, said ferromagnetic shield plates and at least one printed board being piled up alternately, said cores being arranged as passed through said ferromagnetic shield plates and printed board, said first hole in said ferromagnetic shield plate being arranged between the respective adjacent oscillating wires of the same core, said second hole being arranged in the middle of each oscillating winding width and the input coils and spiral output coils of said printed board being magnetically coupled with the oscillating winding so as to form a parametron circuitry.

2. A parametron device comprising a core group in which a plurality of oscillating coils of parametrons oscillating as tuned with the stray capacity of a winding are arranged on a wire having a ferromagnetic film formed on the surface and the ferromagnetic wires having the above mentioned oscillating coils are arranged in parallel with each other and as separated from each other and are also arranged in the form of a matrix so that the respective parametrons may be different by a pitch divided by an integer of the arranging distance of the respective oscillating coils in the axial direction of the above mentioned ferromagnetic wire in turn according to the order of the exciting beats, printed board having a plurality of holes which are provided at fixed intervals and through which the above mentioned cores can be passed so that spiral output coils provided around said holes and input coils having at least one turn may form a closed circuit and ferromagnetic shield plates having first holes of a size sufficient to obtain at least two independent positions in which the coupling coefficient with the above mentioned oscillating coil obtains substantially the same value within the winding width and second holes having a diameter sufficient to pass the above mentioned core and to intercept the magnetic coupling above and below it, said ferromagnetic shield plates and at least one printed board being piled up alternately, said cores being arranged as passed through said ferromagnetic shield plates and printed board, said first hole in said ferromagnetic shield plate being arranged between the respective adjacent oscillating wires of the same core, said second hole being arranged in the middle of each oscillating winding width, the input coils and spiral output coils of said printed plate being magnetically coupled with the oscillating winding so as to form a parametron circuit and at least another printed board having the same function as of the printed board arranged between said ferromagnetic shield plates being added.

3. A method of making parametron devices wherein printed board having a plurality of holes which are provided at fixed intervals and through which the above mentioned cores can be passed so that spiral output coils provided around said holes and input coils having at least one turn may form a closed circuit, ferromagnetic shield plates having first holes of a size sufficient to obtain at least two independent positions in which the coupling coefficient with an oscillating coil obtains substantially the same value within the winding width and second holes having a diameter sufficient to pass a core and to intercept the magnetic coupling above and below it and spacers having holes through which the core can be passed are piled up by passing through them guide bars provided on a fixed base in the order of the ferromagnetic shield plate, spacer, printed board, spacer, ferromagnetic shield plate, spacer, printed board, spacer and ferromagnetic shield plate, are heated so that a plastic adhesive with which the respective plates have been painted in advance may be fused to integrally combine them, this combination is pulled off the above mentioned guide bars, a plurality of oscillating coils of parametrons oscillating as synchronized with the stray capacity of the winding are arranged at determined intervals on each wire having a ferromagnetic film formed on the surface, said ferromagnetic film wires having the oscillating coils are inserted in the form of a matrix into the holes through which the guide bars had been passed so that the respective parametrons may be different by a pitch divided by an integer of the arranging distance of the respective oscillating coils in the axial direction in turn according to the order of the exciting beats, said first hole in the ferromagnetic shield plate is arranged between the respective adjacent oscillating coils of the same core, said second hole is arranged in the middle of each oscillating coil width, the input and output coils of said printed boards are magnetically coupled with the oscillating coils so as to form a parametron circuitry and then an insulative solid solution is poured around the cores so as to integrally form them.

4. A parametron device according to claim 1 comprising a ferromagnetic wire, a tubular spacer arranged around said ferromagnetic wire, said spacer being provided at one end with a recessed part in which the end part of the other spacer is to be fitted, an oscillating coil wound on the outer periphery of said tubular spacer, a printed plate having an output coil and an input coil piled up and arranged on the outer periphery of said oscillating coil and a ferromagnetic plate.

5. A parametron device according to claim 2 comprising a ferromagnetic wire, a tubular spacer arranged around said ferromagnetic wire, said spacer being provided at one end with a recessed part in which the end part of the other spacer is to be fitted, an oscillating coil wound on the outer periphery of said tubular spacer, a printed plate having an output coil and an input coil piled up and arranged on the outer periphery of said oscillating coil and a ferromagnetic plate.

6. A parametron device according to claim 1 comprising a tubular spacer having an oscillating coil on the outer periphery and a hole through which a ferromagnetic film wire can be passed in the center, a molded spacer having a hole which can contain said tubular spacer and fitted with a ferromagnetic shield so as to bite on the outer periphery, a molded spacer having a recessed part into which a tubular spacer can be fitted from both ends and fitted with a ferromagnetic shield so as to bite on the outer periphery and a printed plate on which are formed an output coil and input coil, said spacer, printed board, spacer, printed board and spacer being piled up in the mentioned order, said tubular spacer being contained in the hollow within them and further said ferromagnetic film wire being passed through it.

7. A parametron device according to claim 2 comprising a tubular spacer having an oscillating coil on the outer periphery and a hole through which a ferromagnetic film wire can be passed in the center, a molded spacer having a hole which can contain said tubular spacer and fitted with a ferromagnetic shield so as to bite on the outer periphery, a molded spacer having a recessed part into which a tubular spacer can be fitted from both ends and fitted with a ferromagnetic shield so as to bite on the outer periphery and a printed plate on which are formed an output coil and input coil, said spacer, printed board, spacer, printed board and spacer being piled up in the mentioned order, said tubular spacer being contained in the hollow within them and further said ferromagnetic film wire being passed through it.

8. A parametron device according to claim 1 wherein a plurality of input coils are arranged in at least two places in which is obtained the same coupling coefficient in an oscillating winding having a winding width, an output coil is arranged in either one of said places and a loading coil equivalent to a spiral output coil is arranged in the other.

9. A parametron device according to claim 2 wherein a plurality of input coils are arranged in at least two places in which is obtained the same coupling coefficient in an oscillating winding having a winding width, an output coil is arranged in either one of said places and a loading coil equivalent to a spiral output coil is arranged in the other.

10. A parametron device according to claim 1 wherein, in a plurality of oscillating coils arranged in respectively different positions of each element of cubic matrix, oscillating coils to which are given respective inputs carrying out a majority decision logic or oscillating coils branching the same output are parallelly connected or magnetically parallelly coupled with each other.

11. A parametron device according to claim 2 wherein, in a plurality of oscillating coils arranged in respectively different positions of each element of cubic matrix, oscillating coils to which are given respective inputs carrying out a majority decision logic or oscillating coils branching the same output are parallelly connected or magnetically parallelly coupled with each other.

No references cited.

JAMES W. MOFFITT, Primary Examiner